Patented Feb. 26, 1924.

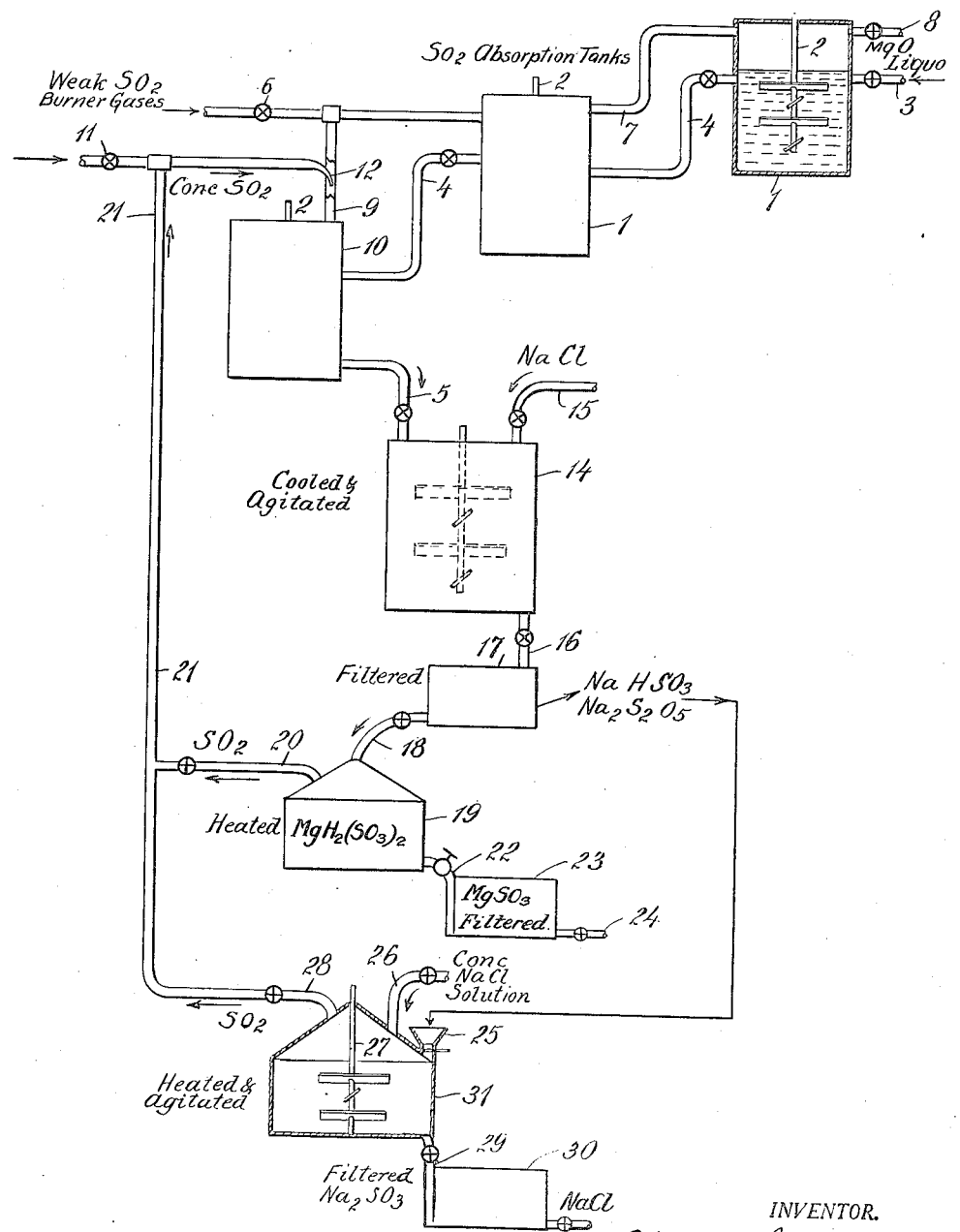

1,484,818

UNITED STATES PATENT OFFICE.

VIGGO DREWSEN, OF LARCHMONT, NEW YORK, ASSIGNOR TO WEST VIRGINIA PULP AND PAPER COMPANY, OF NEW YORK, N. Y., A CORPORATION OF DELAWARE.

PROCESS OF MAKING SODIUM SULPHITES.

Application filed October 12, 1921. Serial No. 507,367.

*To all whom it may concern:*

Be it known that I, VIGGO DREWSEN, a citizen of the United States, and now residing at Larchmont, county of Westchester, and State of New York, have made certain new and useful Improvements Relating to Processes of Making Sodium Sulphites, of which the following is a specification.

This invention relates especially to processes of making sodium bisulphite and sodium monosulphite by first producing bisulphite of magnesium, and then reacting thereon with sodium chloride which, under suitable conditions, produces large proportions of precipitated sodium bisulphite, usually partly or largely in its anhydrous form, which may be refined, sold and used. These sodium acid sulphites may, however, be converted into the monosulphite of sodium as by heating and agitating the same with a strong solution of sodium chloride or other suitable salt which largely precipitates the normal sodium monosulphite which may be filtered out and refined if desired for use or sale.

This process may be conveniently carried out by first forming bisulphite of magnesium as by treating milk of magnesia solution with burner gases, or other suitable sulphur dioxide gases, which in weak condition form magnesium bisulphite of a concentration up to about 29% or so after which substantially no further absorption of the weak sulphur dioxide gases takes place. If, however, a greater concentration of sulphur dioxide is used; as by using, with the burner gases or otherwise, strong or 100% sulphur dioxide, further absorption of the gases takes place so that a much stronger solution of the magnesium bisulphite may be produced, up to 58 or 60% or so.

Such a strong water solution of magnesium bisulphite when a considerable proportion of solid sodium chloride is incorporated therewith, and the mixture cooled, forms sodium bisulphite. This mixing is preferably done in about the theoretical proportions of 180 parts by weight of the magnesium bisulphite and about 117 parts by weight of sodium chloride, the reaction which occurs forming magnesium chloride and sodium bisulphite in regular or anhydrous form in about the manner indicated by the following formula:

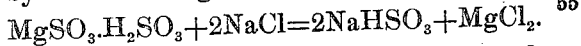
$MgSO_3.H_2SO_3 + 2NaCl = 2NaHSO_3 + MgCl_2.$

When this mixture is cooled and agitated, the sodium chloride seems to be progressively absorbed with a corresponding precipitation of the sodium bisulphite which is thrown down to a very considerable extent, usually about 70 to 74% or so of the magnesium bisulphite being converted into the precipitated sodium bisulphite in this way. As this reaction usually takes place, water seems to be eliminated from the sodium bisulphite which is largely precipitated in the anhydrous form of sodium meta-bisulphite, that is sodium pyrosulphite or anhydrous acid sulphite of sodium, having the formula $Na_2S_2O_5$, which seems to represent more closely the usual precipitated composition. The precipitated material is, of course, filtered off and may be refined as by crystallization or otherwise, and sold or used for various purposes.

An illustrative apparatus for carrying out this process is shown diagrammatically in the accompanying drawing. A series of absorption tanks 1 may be arranged to receive milk of magnesia liquor through the pipe 3, so that in each tank the liquor is agitated as by the stirring device 2 before flowing through the pipe 4 to the succeeding tank. Weak sulphur dioxide, such as sulphur burner gases, may be supplied through the pipe 6, so as to flow successively through these absorption tanks in the opposite direction to the flow of liquor therethrough. This, as previously described, produces magnesium bisulphite of moderate strength up to about 29% concentration; and still stronger bisulphite solution may be produced by using an additional absorption tank 10 receiving this weak bisulphite liquor which is there treated preferably under pressure by stronger sulphur dioxide gases, such as may be produced by enriching the burner gases with strong or concentrated sulphur dioxide from the pipes 11, 21, for example. These may communicate with a mixing or injector nozzle 12 in the pipe 9 so that the gas in the tank 10 is considerably stronger and can carry the bisulphite concentration up to 58 or 60%, if desired, before it passes out through the pipe 5 into the mixing tank 14. Here sodium chloride is incorporated in dry form or as a concentrated solution; and when the mixture is cooled and agitated sodium acid sulphites are progressively formed and precipitated as previously described. The converted liquor may be continually or intermittently delivered through the pipe 16 into the filter press 17, where the sodium bisulphite in its normal or anhydrous acid form is separated, while the filtrate containing magnesium chloride and the remaining 25–30% of unconverted magnesium bisulphite may be discharged through the pipe 18 into the heating pan or converter 19. The heat here drives out sulphur dioxide in concentrated or substantially pure form into the pipe connection 20 and main 21, while the magnesium monosulphite which remains is thereupon precipitated and may pass through the pipe 22 into the filter press 23, where this magnesium sulphite may be removed for refining or purifying processes. If desired, however, the solution may be evaporated, which precipitates the sodium chloride after which the magnesium chloride may be allowed to crystallize out preferably when the magnesium chloride solution has a specific gravity of 1.34 which may be produced by running the boiling point of the concentrated mixture up to about 140° C.

Sodium bisulphite in the form of the ordinary bisulphite, or the meta-bisulphite, which may be produced in any suitable way, may be subjected to the catalytic action of sodium chloride to form sodium monosulphite and highly concentrated or substantially pure sulphur dioxide which may be used to enrich the burner gases in the earlier step of this process. These two materials sodium chloride and sodium meta-bisulphite or sodium pyrosulphite react in concentrated solution so as to drive off sulphur dioxide and this reaction may be conveniently effected by combining with a concentrated solution of sodium chloride, the solid acid sulphite of sodium. This may be done in a heating or converting pan 31, having an agitator 27, if desired, and a funnel or feeding device 25 into which may be fed the sodium bisulphites, such as may be produced in this process. A concentrated sodium chloride solution may also be fed into this heating pan through the pipe 26, so as to mix with and react upon the bisulphites under the heat imparted to the mixture, which effects the elimination of the sulphur dioxide gas and the simultaneous production of the monosulphite of sodium which is substantially insoluble in the sodium chloride solution at the higher temperatures used, so as to be substantially precipitated and rendered recoverable by filtration or other methods.

The strong or concentrated sulphur dioxide eliminated by this treatment may pass through the pipe connection 28 into the main 21, leading to the absorption tanks and a similar pipe connection 20, may carry the strong sulphur dioxide produced in the converting pan 19 into this main for similar utilization. The treated mixture may be discharged through the pipe 29 into the filter press 30 where the soduim monosulphite may be removed from the sodium chloride filtrate.

If desired, the sodium monosulphite may be purified by re-crystallization or other methods before being sold or used for various purposes such as the treatment of wood or other vegetable fibre material for the production of cellulose fibre for paper and other purposes.

This invention has been described in connection with a number of illustrative materials, proportions, apparatus, conditions, temperatures, times of treatment and methods of use to the details of which disclosure the invention is not of course to be limited, since what is claimed as new and what is desired to be covered by Letters Patent is set forth in the appended claims.

1. The process of making soduim sulphite which comprises agitating milk of magnesia liquor in a series of absorption tanks through which sulphur dioxide gases are passed in the opposite direction to form weak magnesium bisulphite, agitating said weak magnesium bisulphite in an atmosphere of strong sulphur dioxide to form strong magnesium bisulphite of over 50% concentration, mixing such concentrated magnesium bisulphite solution with dry sodium chloride and cooling and agitating the same to progressively form and precipitate sodium meta-bisulphite and filtering the same from the mixture, heating the filtrate to drive off concentrated sulphur dioxide for the production of such concentrated magnesium bisulphite, heating and agitating said soduim meta-bisulphite in a concentrated sodium chloride solution to drive off concentrated sulphur dioxide and to simultaneously produce sodium monosulphite and filtering the same from the mixture.

2. The process of making sodium sulphite which comprises agitating milk of magnesia liquor in a series of absorption tanks through which sulphur dioxide gases are passed in the opposite direction to form weak magnesium bisulphite, agitating said weak magnesium bisulphite in an atmosphere of strong sulphur dioxide to form strong magnesium bisulphite, mixing such concentrated magnesium bisulphite solution with sodium chloride and cooling and agitating the same to progressively form and precipitate sodium meta-bisulphite, heating the filtrate to drive off concentrated sulphur dioxide for the production of such concentrated magnesium bisulphite, heating and agitating said sodium meta-bisulphite in a concentrated salt solution to drive off concentrated sulphur dioxide for the production of such concentrated magnesium bisulphite and to simultaneously produce sodium monosulphite.

3. The process of making sodium sulphite which comprises agitating milk of magnesia liquor in a series of absorption tanks through which sulphur dioxide gases are passed in the opposite direction to form strong magnesium bisulphite, reacting on such concentrated magnesium bisulphite solution with dry sodium chloride to form and precipitate sodium meta-bisulphite, heating and agitating said sodium meta-bisulphite in a concentrated salt solution to drive off concentrated sulphur dioxide for the production of such concentrated magnesium bisulphite and simultaneously produce sodium monosulphite.

4. The process of making sodium sulphite which comprises agitating milk of magnesia liquor in a series of absorption tanks through which sulphur dioxide gases are passed in the opposite direction to form strong magnesium bisulphite, reacting on such concentrated magnesium bisulphite solution with sodium chloride to form and precipitate sodium bisulphite, heating and agitating said sodium bisulphite in a concentrated salt solution to produce sodium monosulphite.

5. The process of making sodium sulphite which comprises absorbing sulphur dioxide in milk of magnesia liquor to form strong magnesium bisulphite, reacting on such magnesium bisulphite solution with sodium chloride to form and precipitate sodium bisulphite, and heating and agitating said sodium meta-bisulphite in a concentrated salt solution to produce sodium monosulphite.

6. The process of making sodium sulphite which comprises absorbing sulphur dioxide in milk of magnesia liquor to form magnesium bisulphite, reacting on such magnesium bisulphite with sodium chloride to form and precipitate sodium bisulphite, and heating said sodium meta-bisulphite in a concentrated salt solution to produce sodium monosulphite.

7. The process of making sodium meta-bisulphite which comprises agitating milk of magnesia liquor in a series of absorption tanks through which weak sulphur dioxide gases are passed in the opposite direction to form weak magnesium bisulphite solution agitating said weak magnesium bisulphite under pressure in an atmosphere of strong sulphur dioxide to form strong magnesium bisulphite of over 50% concentration, mixing such concentrated magnesium bisulphite solution with dry sodium chloride and cooling and agitating the same to progressively form and precipitate sodium meta-bisulphite and filtering the same out of the mixture and purifying the same.

8. The process of making sodium meta-bisulphite which comprises agitating milk of magnesia liquor in an absorption tank into which weak sulphur dioxide gases are passed to form weak magnesium bisulphite solution agitating said weak magnesium bisulphite in an atmosphere of strong sulphur dioxide to form strong magnesium bisulphite of over 50% concentration, mixing such concentrated magnesium bisulphite solution with dry sodium chloride and cooling and agitating the same to progressively form and precipitate sodium meta-bisulphite.

9. The process of making sodium meta-bisulphite which comprises treating milk of magnesia liquor with weak sulphur dioxide gases to form weak magnesium bisulphite solution treating said weak magnesium bisulphite with strong sulphur dioxide to form strong magnesium bisulphite of over 50% concentration, incorporating such concentrated magnesium bisulphite solution with sodium chloride and cooling the same to progressively form and precipitate sodium meta-bisulphite.

10. The process of making sodium bisulphite which comprises treating milk of magnesia liquor with sulphur dioxide gases to form strong magnesium bisulphite incorporating such concentrated magnesium bisulphite solution with sodium chloride to form and precipitate sodium bisulphite.

11. The process of making sodium bisulphite which comprises agitating strong magnesium bisulphite solution of over 50% concentration with sodium chloride and cooling the same to progressively form and precipitate sodium bisulphite.

12. The process of making sodium bisulphite which comprises reacting on magnesium bisulphite with sodium chloride to form sodium bisulphite.

13. The process of making sodium meta-bisulphite which comprises reacting on milk of magnesia liquor with weak sulphur dioxide gases to form weak magnesium bisulphite solution, agitating said weak magnesium bisulphite under pressure in an atmosphere of strong sulphur dioxide to form a strong aqueous solution of magnesium bisulphite and reacting thereon with sodium chloride to form and precipitate sodium meta-bisulphite.

14. The process of making sodium bisulphite which comprises reacting on magnesia liquor with sulphur dioxide gases to form weak magnesium bisulphite solution agitating said weak magnesium bisulphite in an atmosphere of strong sulphur dioxide to form a strong aqueous solution of magnesium bisulphite and reacting thereon with sodium chloride to form sodium bisulphite.

VIGGO DREWSEN.